United States Patent [19]

Dannatt

[11] Patent Number: 4,500,197
[45] Date of Patent: Feb. 19, 1985

[54] TRANSPORT MEANS FOR FLAT BED SCANNER

[75] Inventor: Hugh St. L. Dannatt, Bethel, Conn.

[73] Assignee: Pitney Bowes Inc., Stamford, Conn.

[21] Appl. No.: 481,507

[22] Filed: Apr. 1, 1983

[51] Int. Cl.³ .............................................. G03G 15/28
[52] U.S. Cl. ........................................ 355/8; 358/285
[58] Field of Search ................ 355/8, 3 R, 11, 133, 355/66; 358/285, 286, 293

[56] References Cited

U.S. PATENT DOCUMENTS

| | | | |
|---|---|---|---|
| 4,355,883 | 10/1982 | Landa | 355/8 |
| 4,367,945 | 1/1983 | Abe | 355/8 X |
| 4,371,254 | 2/1983 | Beery | 355/8 |
| 4,377,337 | 3/1983 | Beck | 355/8 |
| 4,436,416 | 3/1984 | Negoro et al. | 355/8 X |
| 4,448,514 | 5/1984 | Fujii et al. | 355/8 |

*Primary Examiner*—R. L. Moses
*Attorney, Agent, or Firm*—Martin D. Wittstein; William D. Soltow, Jr.; Albert W. Scribner

[57] ABSTRACT

Within a copier, a scanning carriage assembly is mounted for reciprocal motion upon a pair of elongate parallel, spaced apart guides. A pair of flexible drive members rotatably mounted in juxtaposition to the guides, and are each separately mounted on opposing lateral ends of the carriage structure. The flexible drive members are driven simultaneously from a common shaft, and there is also a pair of stabilizing cables mounted parallel to the guides and terminally connected to end frames of the copier framework. The cables are guided by pulleys which are mounted on the carriage structure in parallel relationship to the spaced apart guides. The pulleys and spaced apart guides are arranged in parallel relationship to each other and the pulleys, spaced apart guides, belts and cables are positioned and mounted in order to obtain substantially equal and opposite tension within the stabilizing cables on opposing sides of the carriage during reciprocal carriage motion.

5 Claims, 4 Drawing Figures

TRANSPORT MEANS FOR FLAT BED SCANNER

BACKGROUND OF THE INVENTION

1. Field of the Invention

The present invention relates to a scanning carriage assembly for use in an electrophotographic machine employing a charge coupled device sensor or similar reproducing and document scanning apparatus. In particular, it relates to the structural support of the carriage assembly and especially to the scanner drive and stabilizing cables incorporated within the assembly to provide stabilizing tension to the scanner assembly during reciprocal scanning motion. The scanning carriage assembly is that type of scanning apparatus provided for reproducing original documents in a reproduction machine. The optical scanner utilized is a charge coupled device (CCD sensor) which is used in place of more bulky conventional optics in the prior art document scanners. The prior art has typically demonstrated the use of the combination of lens optics and mirrors in order to achieve translation of the image of an illuminated object placed on a document platen glass to an imaging station where the image is exposed unto a sensitized photoconductor.

The application and use of the CCD sensor as a scanner provides a way to greatly reduce dimensional space requirements taken up previously by prior art by optical scanning apparatus because of the relative small size of the CCD sensor assembly. The means of reducing the scanner size is demonstrated in the present invention and when combined with other new electronic technology allows the image of the source material to be processed and developed in different efficient ways. For example, the resultant image may be converted into a train of electronic pulses which are reconstructed on a cathode ray tube which may be remotely situated and then projected directly unto a photoconductor surface where conventional copier processes are used for image development and transfer of the image unto copy paper.

A typical CCD scanner is partially comprised of a scanner assembly having an optical path with dual mirrors which are arranged compactly so that multiple reflections are generated between the two mirrors. There may be typically six reflections of an image between the two mirrors which necessitates maintaining a strict unyieldable structural relationship between the two mirrors. The need for a rigid vibration-free relationship between the CCD scanner and the mirrors becomes especially critical during translating motion of the scanner carriage.

Presently, a copending application serial number 378,038, entitled Folded Beam Adjustment and filed May 14, 1982 by the inventor, Hugh Dannatt, of the present invention demonstrates the solution of certain problems relating to obtaining a direct illuminated image by adjusting the CCD lens unit to the cooperating, compactly-arranged mirrors without physically adjusting the mirrors. Avoidance of disturbing this particular mirror arrangement is highly desirable because of the inherent difficulty in aligning and rigidity holding mirrors designed and intended to generate multiple reflections. These difficulties are greatly compounded because of the mounting of the mirrors in a carriage which is slidably mounted on rails and supported in structure comprising the framework of a machine which has other mechanisms additionally mounted to such framework thereby causing various vibrations or shocks which could adversely effect the reproduction of an image.

2. Description of the Prior Art

U.S. Pat. No. 4,332,460 issued to Costanza describes the problems associated with optical scanning systems which employ lamps, mirrors and reciprocating carriages. The problems described are typical of such equipment and the subject patent goes into detail in providing additional mechanism in the form of shock absorbers to reduce impact of stopping forces felt upon the carriage assembly, lamps and mirrors. The system and auxiliary mechanisms described is typical of the prior art in that substantial space is required to suspend, mount and house the entire scanner. The specification of the subject patent also discloses use of dual driving cables attached to opposing lateral ends of the optical scan carriages and a dash pot is utilized to help reduce the impact of dynamic forces at the ends of the reciprocating carriage motion. In addition, the embodiment incorporates the use of spiral grooves in the cable mounting drums which dominate the lateral positions of the cables as they move laterally during carriage motion.

In view of the prior art, the present disclosure presents a stabilizing means for minimizing dynamic effects induced by variations in the connection of the drive components for optical scanners. The continuous looped carriage drive members utilized in the present disclosure are arranged in a parallel relationship to each other and the scanner guide members. The cables remain parallel to the guide members during all phases of the scanning functions. In addition, the carriage drive members in the form of flexible drive members utilized in the present arrangement are not subject to diagonal and tensile load variations due to spiral grooves in the driving member drums which otherwise force side-wise tracking of the prior art drive members such as cables. Therefore, the present disclosure provides a stable, drive system for an optical document scanner regardless of the effects of variations in the location of the center of gravity of the component parts or differences in tensions of driving members due to tolerances, acceleration or deceleration.

SUMMARY OF THE INVENTION

In accordance with the present invention, a scanning carriage assembly, utilized in a photocopy machine or similar reprographic reproducing apparatus, is provided with a novel carriage stabilizing device.

The present invention is directed towards an optical scanning carriage having a pair of elongate, parallel-spaced apart guides and carriers mounted on each of the guides for movement therealong between fixed end positions. A support carriage is connected to the carriers for moving the carriers between the fixed end positions and including a pair of flexible drive members mounted in juxtaposition to the parallel guides. The flexible drive members are connected to the carriers for moving them on the guides between the fixed end positions.

The flexible drive members are driven in opposing directions from the fixed end positions and are stabilized by a pair of cables attached to the frame of the copier. Both cables extend at least from one fixed end position to the opposing side. Each cable commences at a fixed end of one parallel guide and terminates at the other guide end. Both cables pass through the support carriage and are relatively, movably connected thereto in order to operatively stabilize the support carriage drive movement.

The stabilizing cables prevent any misalignment of the carriage with respect to the parallel guides as may result from slippage or creep of the flexible drive members.

OBJECTS OF THE INVENTION

Accordingly, it is an object of the present invention to provide an optical carriage assembly cooperating with a system which includes provisions to maintain stability of the system during operative movement in opposite reciprocal directions from terminal end positions.

It is another object of the present invention to provide a compact carriage assembly which is substantially reduced in size with respect to the prior art.

For a better understanding of the invention as well as additional objects and features, reference is made to the following drawings and specification.

DESCRIPTION OF THE PREFERRED EMBODIMENT

Figure 1:
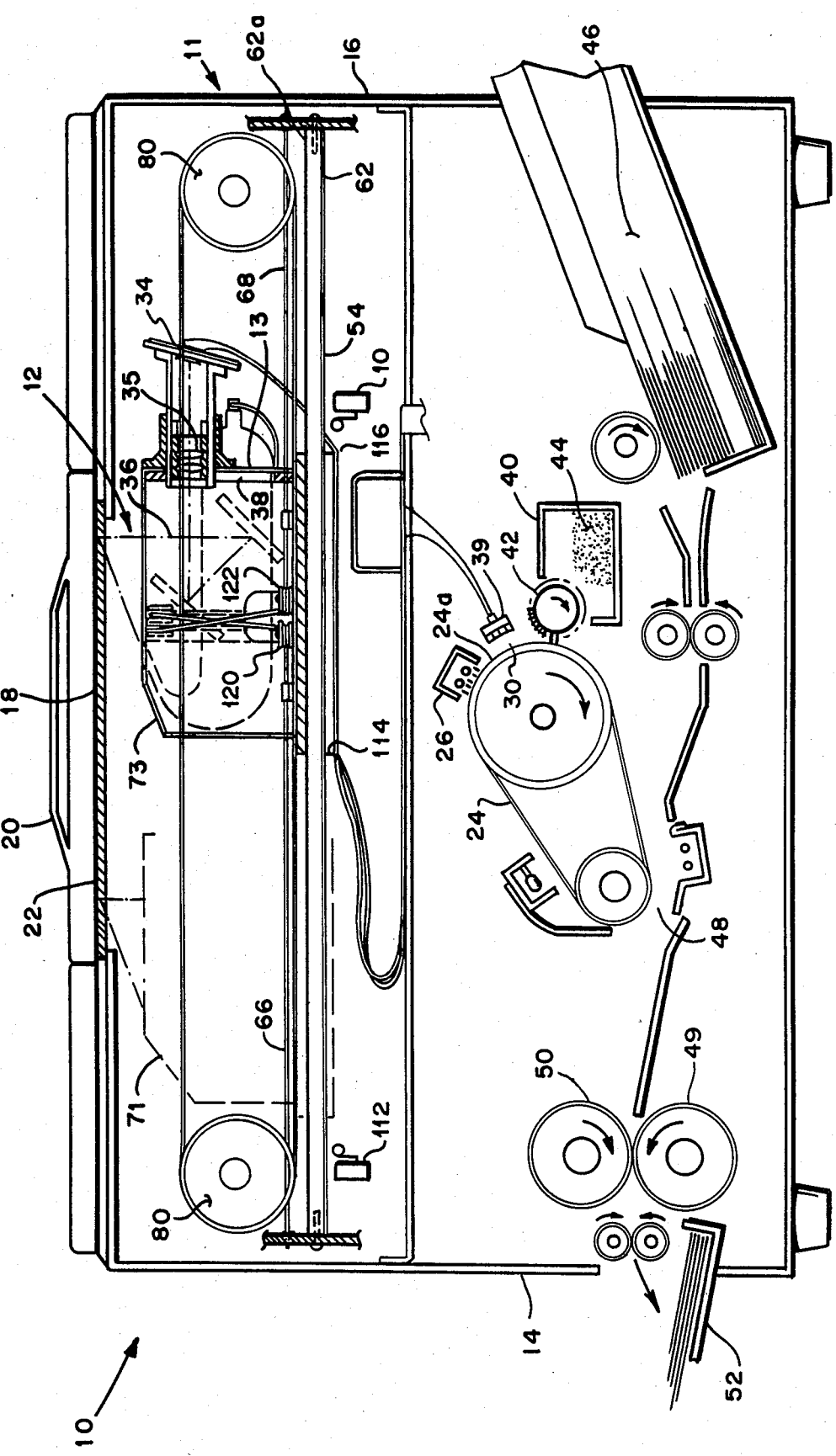
FIG. 1 is a schematic view of a reproduction machine employing an optical scanning carriage assembly mounted on guide rails located under the document platen glass.
Figure 2:
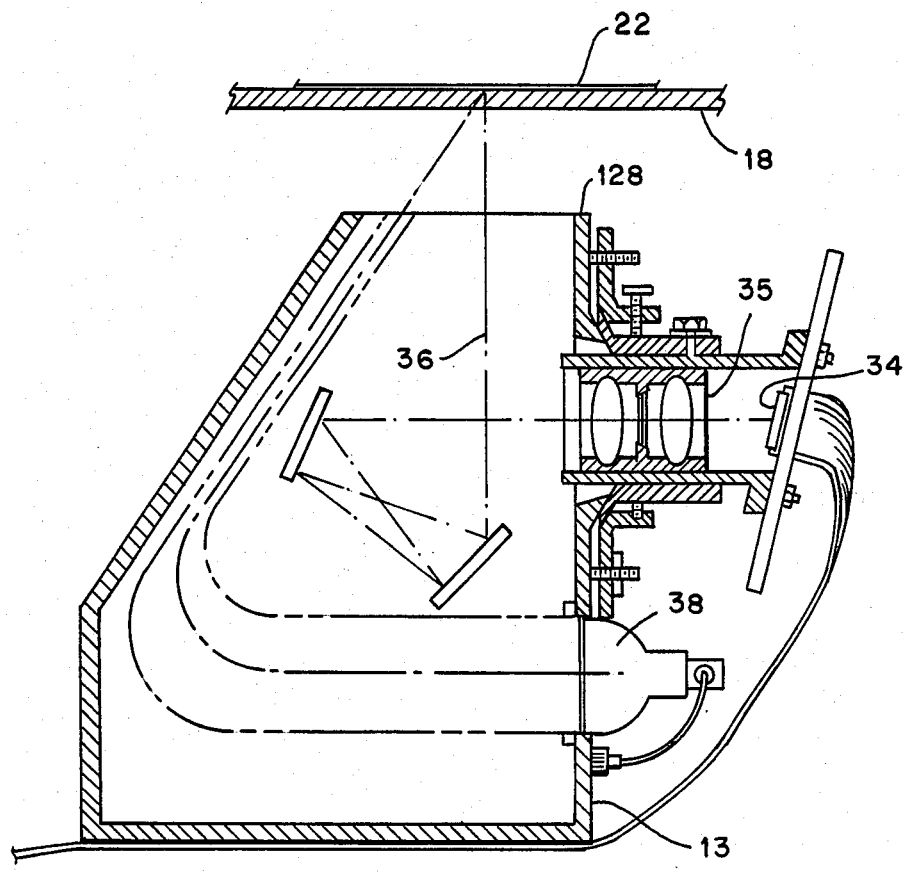
FIG. 2 is an enlarged, partial section and schematic view showing the CCD/lens mount, illuminator and carriage mirror arrangement.

Referring now to the drawings and especially to FIG. 1, a front view of an electrophotographic copier 10 is shown in detail along with an optical scanning carriage assembly 12. The optical scanner carriage assembly 12, as such, is comprised of one structural carriage member 13 which is arranged and supported to hold various functional components on the upper support guides located and secured to the copier 10, framework 11. The framework 11 is comprised of left and right end plates 14 and 16, respectively, which are appropriately mounted to the base and other structure (not shown) of the copier 10. There is a glass platen 18 with an appropriate platen cover 20 which is pivotably mounted over the platen 18 in order to hold down an original document 22 placed face down on the platen 18.

Figure 3:
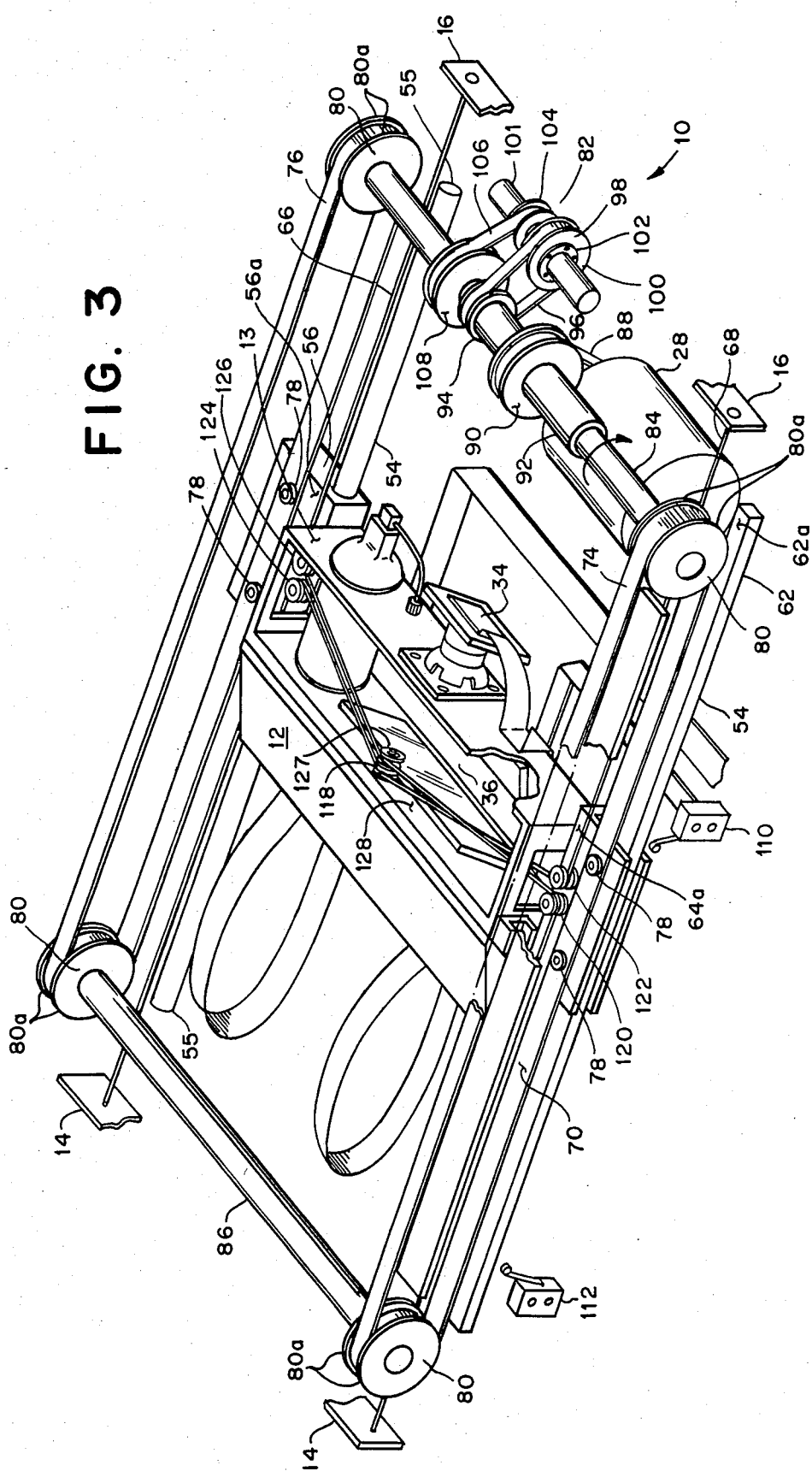
FIG. 3 is an isometric view looking down upon the optical scanning assembly of the present invention.

The copier 10 has an image receiving photoconductor 24 which moves at a constant velocity to match the velocity of the moving optical scanning carriage assembly 12. There is a sensitizing process associated with the photoconductor 24 which initially prepares the photoconductor 24 for receiving the image of the original document 22. The sensitizing process is initiated just after the operator of the copier 10 enables the copier controls and start button (not shown). Immediately after starting the copier 10, the photoconductor 24 begins moving and after traveling a small distance, the electronic copier controls enable the sensitizing charger 26 which provides an electrical charge potential unto the photoconductor image receiving surface 24a. The optical scanning carriage assembly 12 is driven by a reversible DC motor 28 (FIG. 3). The DC motor 28 is utilized as the power source for reversible rotative power for the required reciprocal motion of the optical scanning carriage assembly 12. Consequently, the lineal velocity of the carriage assembly 12 matches the photoconductor 24 surface velocity which is controllable by other electromechanical drive means (not shown).

An image of an original document 22 (FIG. 1) is projected unto the photoconductor surface 24a at the image reception zone 30. The original document 22 is illuminated by an illumination system 38 and is reflected through an optical system 35 and a mirror system 36 so that it is projected upon a receiving charge coupling device 34. Through means described in the previously mentioned copending application, the image is projected upon the photoconductor surface 24a through illumination means associated with the LED (Light Emitting Diode) assembly 39.

In another copending application, Ser. No. 311,696, filed Oct. 15, 1981 by assignee David Kleinschmitt, the merits, details and problems in alignment of the optical system 35, the CCD unit 34, the mirror system 36 and the illumination system 38 are further explained in detail.

When the desired image is projected unto the prepared photoconductor surface 24a through the combined functions of the foregoing described components, the resulting latent image is developed in a conventional manner by a dry developing apparatus 40. Within the dry development apparatus 40, an applicator roller 42, driven by connecting operative devices (not shown), delivers dry toner constituent 44 to the applicator roller 42 which, in turn, brushes the triboelectrically charged constituent 44 unto the moving photoconductor 24a. Consequently, the photoconductor surface 24a either repels or attracts the toner constituent 44 to form the developed image of the original document 22 upon the photoconductor 24. Subsequent steps include transfer of the developed image unto a piece of copy paper, a single sheet of which is fed from a stack 46, for each complete cycle of scan and retrace motion of the optical scanner carriage assembly 12.

When the image is transferred from the photoconductor surface 24a to the copy paper at the transfer station 48, the sheet with image is directed forward along the paper path 49 to a pair of cold pressure fixing rollers 50. The fixing rollers 50 then press the copy paper sheet between them and permanently fix the toner constituent 44 unto the sheet prior to being stacked in a sheet receiving tray 52 for the convenience of the operator.

Referring to FIG. 1, the scanning carriage assembly 12 is mounted upon a pair of elongate parallel, spaced-apart guides 54. There is a round elongate guide 55 (FIG. 3) which rides lineal support bearings (not shown), mounted in the structure comprising a rear lateral support 56 of the optical scanning carriage assembly 12. The second elongate guide 62 is in the present preferred embodiment shaped from a bar with at least one flat surface 62a. The flat surface 62a serves to vertically position the front lateral carriage support 64 of the optical scanning carriage assembly 12.

The left and right end plates 14 and 16, respectively, form ends of a box-like architectural support for the spaced-apart, as such, guides 54 including the round guide 55, and the second elongate guide 62. The elongate guides 55 and 62 are each appropriately secured to the end plates 14 and 16 with hardware (not shown) in order to form a substantially rigid support for the translating scanning carriage assembly 12.

In addition to the elongate guides 55 and 62, there is a rear stabilizing cable 66 (FIG. 3) and a front stabilizing cable 68 which are arranged and tensioned to span between while being appropriately attached by hardware (not shown) to the end plates 15 and 17. There is a pulley system 70 which provides a path and guide to hold the stabilizing cables 66 and 68 which allows the stabilizing cables 66 and 68 to be indirectly attached through rotatable pulleys which are secured, as such, to the scanner assembly 12. The indirect attachment of each stabilizer cable 66 and 68 through the pulley system 70 enables the scanner assembly to move reciprocally between terminal, fixed end positions represented by the left and right alternate terminal positions 71 and 73, respectively, in FIG. 1. In addition to the stabilizing cables 66 and 68, there is a pair of flexible drive members, as such, a front endless belt 74 and a rear endless belt 76 which are suspended and driven unitarily and synchronously by provisions to be described in the following text. The respective front and rear endless belts 74 and 76 are directly attached by appropriate hardware such as the screws 78 to the optical carriage scanner assembly 12 in a juxtaposition relationship to the parallel, elongate spaced-apart guides 54 at the front lateral support 64 and the rear lateral support 56. The endless belts 74 and 76 are fabricated from a substantially in-elastic but flexible material such as woven polyester. For example, such as that manufactured by Albany International, Precision Components Division, Middletown, CT 06457 and marketed under the name of Panther L. This type of material insures that minimal distortions and perturbations be induced into the endless belts 74 and 76 by accelerating or decelerating forces transposed from the DC motor 28.

The DC drive motor 28 providing motion is connected with the endless belts 74 and 76 through individual endless belt cylindrically shaped support pulleys 80. To achieve the correct lineal speeds of the carriage 12 there is a timing belt reduction drive 82 which supplies the required reversible motion through suitable connection to an input shaft 84 which also conveniently supports the individual cylindrically shaped endless belt support pulleys 80. The input shaft 84 is rotatably supported in appropriate bearings (not shown) at the front and rear copier frame walls (also not shown).

There is a second shaft 86 supporting a pair of cylindrically shaped pulleys 80 and which is also rotatably supported by appropriate bearings similar to those supporting the input shaft 84. As mentioned, the second shaft 86 has two additional individual endless belt cylindrically shaped support pulleys 80 which serve to provide the correct location, support and tension to the cooperating endless belts 74 and 76. All of the individual cylindrically shaped support pulleys 80 have flanges 80a which serve to laterally locate and track the endless belts 74 and 76.

The timing belt reduction drive 82 is designed to provide lower RPMs to the input shaft 84 as taken from the DC motor 28. A drive belt 88 is adapted to a pulley (not shown) which is appropriately connected to the high speed drive shaft of the DC motor 28. The drive belt 88 drives pulley 90 which is appropriately connected to a drive tube 92. The drive tube 92 is rotatably supported in bearings located within the structure (not shown) of the copier 10 which forms the main structure of the copier 10. Therefore, when the drive tube 92 is driven clockwise or counterclockwise, the requirements of reciprocably driving the optical carriage scanning assembly 12 to the left and right terminal positions 71 and 73 (FIG. 1) respectively fulfills the function of scanning the document 22 length. A pulley 94 is attached to the drive tube 92 alongside the pulley 90 in order to appropriately drive a belt 96. The belt 96 provides a further speed reduction since it is engaged with a larger pulley 98 of a compound pulley assembly 100. The compound pulley assembly 100 is rotatably mounted with appropriate bearings 102 on a shaft 101 with structural support provided from the copier 10 structure (not shown). The smaller pulley 104 of compound pulley assembly 100 engages another timing belt 106 which is connected with a larger pulley 108 and which, in turn, is appropriately attached to the input shaft 84 thereby providing the desired slower RPM and necessary resultant torque to drive the optical scanning carriage assembly 12 at one speed for the copy function, and a higher speed for retrace to the initial fixed terminal starting position as such represented by the position 73 of the scanner assembly 12.

It will be recognized by those skilled in the art that the timing belt drive reduction 82 in the present arrangement to the input shaft 84 enables the input shaft 84 to provide a constant high torque and angular velocity to that shaft and that this power and motion is equally divided to both the front and rear endless belts 74 and 76, respectively. The net result of the simultaneous torque and drive motion imparted to endless belts 74 and 76 is that minimal speed variations are imparted to the scanner 12 as such through attachment to the front and rear lateral ends of the carriage assembly 12 as previously described.

Conventional copier scanners typically have the drives connected to one side only of the scanner assembly which necessitates having to provide auxiliary balancing mechanisms which consider the center of gravity of the scanner assembly to reduce unwanted dynamic effects such as cogging, vibration or jitter. Jitter, for example, will show up directly in the produced copies as an undesirable visual effect which distorts the desired reproduced image.

In the present embodiment, the optical scanner carriage assembly 12 is substantially reduced in size over the prior art which is a great benefit for providing a very compact copier with internal scanning optics. The nature of the combination of the components within the present disclosure additionally provides less mass in the optical carriage scanner assembly 12 to be accelerated and decelerated during the scan and retrace functions from the left and right terminal positions 71 and 73. In addition, it has been the intention and aim of the present disclosure to provide a very compact optical scanner carriage assembly by combining stabilizing cables with separate, flexible drive members in the form of endless drive belts which cannot wander laterally, an electronic charge coupling device with a mirror and lens system, along with the support and guiding apparatus to move the entire carriage scanner assembly in a very smooth manner with minimal distortion which would otherwise cause jitter or perturbations effecting copy quality if accomplished in the conventional means of prior art.

The previously described timing belt reduction drive 82 provides a convenient, quiet and efficient means of providing high torque and reciprocal scan and retrace motion to the optical carriage scanner assembly 12. The left and right terminal positions 71 and 73 (FIG. 1)

which define the beginning and end of scan and retrace are determined physically by end of carriage motion switches S1 and S2, 110 and 112, respectively. The left and right ends 114 and 116 of the front lateral support 64 are positioned to engage the trip arms of the switches 114 and 116 which when enabled cause an electronic control (not shown) to reverse direction of the scanner assembly 12 or in order to allow the scanner assembly 12 to stop in the home starting position which is represented by position 73 as illustrated in FIG. 1.

Figure 4:
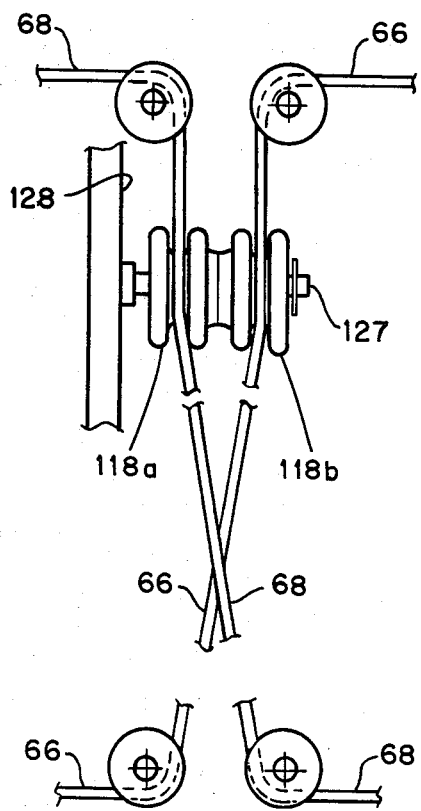
FIG. 4 is a partial view taken from FIG. 3 of the center cable guide pulleys mounted on the vertical wall of the scanner support carriage.

There are five separate cable support pulleys as such represented by the pulleys 118, 120, 122, 124 and 126, all of which are appropriately fastened and secured to vertical and horizontal surfaces of the structural carriage member 13. The pulleys 120 and 126 guide stabilizing cable 66 which is tensioned from the copier 10 left end plate 14 reaching through a span to pulley 120 which is mounted horizontally on the front lateral support 64a of the structural carriage member 13. The stabilizing cable 66 then crosses the lateral width of carriage member 13 being supported by the freely rotatable pulley 118b (FIG. 4) which is mounted on an appropriate stud 127 on a vertical wall 128 of the carriage member 13 and then being guided by the pulley 126 which is also mounted on the horizontal surface 56a of the rear support rail 56 of the structural carriage member 13 so that the cable 66 may be tensioned in a parallel direction to the round guide 55 and be secured to the copier 10 right end plate 16.

Similarly, cable 68 is secured to the copier 10 right end plate 16 and is located parallel to the second elongate guide 62 as it is tensioned and spanned to the pulley 122 which is mounted in a similar manner as the pulley 120. The stabilizing cable 68 then laterally crosses the structural carriage member 13, being supported mid span in a freely rotatably pulley 118a (FIG. 4) which enables the stabilizing cables 66 and 68 to cross each other, while allowing the pulleys 118a and 118b to rotate in counter directions while the optical scanning carriage 12 is traversing its intended reciprocal path. The stabilizing cable 68 then passes around the pulley 124, which is mounted on the rear support wall 56 of structure 13 in a similar manner as described for pulley 126, so that the tensioned cable 68 may span to the left end plate 14 for location and attachment. It should be pointed out that the tensioned stabilizing cables 66 and 68 are arranged to lie substantially parallel to the round guide 55 and the second elongate guide 62 in order to prevent undue lateral forces resulting from components of the tensile forces in the stabilizing cables 66 and 68 from adversely effecting the optical scanning carriage scanner 12 traversing motion. This parallel arrangement heretofor described has been found to greatly benefit the ability of the optical scanner described herein to produce clear, jitter-free copy output. In addition, the fact that the front and rear endless belts 74 and 76 are arranged parallel to the guides 55 and 62 as such also contribute to the efficiency of the present system.

Having described and illustrated on embodiment of the present invention, it will be apparent that various modifications and alterations may be made thereto. It is therefore intended that the scope of the present invention shall be limited only as defined in the following claims:

What is claimed is:

1. A scanning carriage assembly for use in a photocopy machine or similar reprographic reproducing apparatus, said assembly comprising:
    (a) a pair of elongate parallel spaced apart guides,
    (b) a support carriage extending between each of said guides and including means connecting said carriage to said guides for movement therealong between fixed end positions,
    (c) electro-optical means mounted on said support carriage in position to scan a document as said carriage moves between said fixed positions,
    (d) a pair of flexible drive members mounted in juxtaposition to said parallel guides and connected to said carriers for moving said carriers on said guides between said fixed end positions,
    (e) means for driving said flexible drive members in opposite directions, and
    (f) a pair of stabilizing cables fixedly connected to a suitable frame portion of the photocopy machine and extending at least from one of said fixed end positions to the other thereof, each of said cables commencing adjacent said fixed end of one of said parallel guides and terminating adjacent the other end of the other of said parallel guides, both of said cables passing through said support carriage and being relatively movably connected thereto, whereby said cables are operative to stabilize said support carriage during movement thereof in order to prevent any misalignment of said carriage with respect to said parallel guides which may result from slippage or creep of said flexible drive members.

2. A scanning carriage assembly as set forth in claim 1 wherein said support carriage includes a pair of cable guide pulleys mounted adjacent each and of said support carriage for guiding said cables from one side of said support carriage to the other.

3. A scanning carriage assembly as set forth in claim 2 wherein said cable guide pulleys are arranged in substantial parallel alignment with said guides, and each of said cables are supported by one pulley of each of said pairs of pulleys, each of said cables being under substantial tension as to exert substantially equal and opposite tension on opposite sides of said support carriage in the direction of carriage movement.

4. A scanning carriage assembly as set forth in claim 1 wherein said flexible drive members are flat belts.

5. A scanning carriage assembly as set forth in claim 1 wherein said means for driving said flexible drive members comprises cylindrically shaped pulley wheels.

* * * * *